(12) United States Patent
Niarfeix et al.

(10) Patent No.: US 8,978,424 B2
(45) Date of Patent: Mar. 17, 2015

(54) DEVICE FOR HOUSING A BEARING PROVIDED WITH A SYSTEM FOR DETECTING THE LOAD APPLIED TO THE BEARING

(75) Inventors: Francois Niarfeix, Saint-Cyr-sur-Loire (FR); Thierry Wable, Cerelles (FR); Sebastiano Calvetto, Collegno (IT)

(73) Assignee: Aktiebolaget SKF, Gothenburg (SE)

( * ) Notice: Subject to any disclaimer, the term of this patent is extended or adjusted under 35 U.S.C. 154(b) by 1975 days.

(21) Appl. No.: 12/086,950

(22) PCT Filed: Dec. 18, 2006

(86) PCT No.: PCT/FR2006/002769
§ 371 (c)(1),
(2), (4) Date: Dec. 8, 2010

(87) PCT Pub. No.: WO2007/077307
PCT Pub. Date: Jul. 12, 2007

(65) Prior Publication Data
US 2011/0088435 A1    Apr. 21, 2011

(30) Foreign Application Priority Data

Dec. 20, 2005 (FR) ...................................... 05 12965

(51) Int. Cl.
| | |
|---|---|
| *D06F 39/12* | (2006.01) |
| *G01B 7/14* | (2006.01) |
| *D06F 39/00* | (2006.01) |
| *D06F 37/26* | (2006.01) |
| *G01B 7/16* | (2006.01) |
| *G01L 1/14* | (2006.01) |
| *G01L 5/00* | (2006.01) |
| *G01M 13/04* | (2006.01) |

(52) U.S. Cl.
CPC ............ *D06F 39/003* (2013.01); *D06F 37/269* (2013.01); *G01B 7/22* (2013.01); *G01L 1/14* (2013.01); *G01L 5/0014* (2013.01); *G01M 13/04* (2013.01)
USPC ... 68/140; 384/448; 324/207.11; 324/207.13; 73/1.79

(58) Field of Classification Search
CPC ........... G01B 7/22; G01L 1/14; D06F 37/269; D06F 39/003
USPC .............. 68/140; 384/448, 614, 623; 73/1.79; 324/207.11, 207.13, 207.15, 207.24
See application file for complete search history.

(56) References Cited

U.S. PATENT DOCUMENTS

| | | | |
|---|---|---|---|
| 6,490,935 B1 * | 12/2002 | Joki et al. ................... | 73/862.49 |
| 7,155,826 B2 * | 1/2007 | Wehrfritz ................... | 29/898.09 |
| 2007/0051187 A1 * | 3/2007 | McDearmon ............ | 73/862.322 |

FOREIGN PATENT DOCUMENTS

DE        102004013669  A1 *  10/2005

OTHER PUBLICATIONS

Machine Translation of DE 102004013669 A1, dated Oct. 2005.*

*Primary Examiner* — Joseph L Perrin
*Assistant Examiner* — Kevin G Lee
(74) *Attorney, Agent, or Firm* — Meyertons, Hood, Kivlin, Kowert & Goetzel, P.C.; Eric B. Meyertons

(57) ABSTRACT

The invention relates to a housing device provided with a system for detecting the load applied to an element arranged in the housing, an internal part configured in such a way as to hold said element, and an external part for fixing the device to a mechanical group, the internal part being connected to the external part by at least two deformable connection parts in such a way that the internal part can be displaced in relation to the external part under the action of a load applied to the element. The system for detecting the applied load comprises a means for directly detecting the displacement of one of the parts, internal or external, in relation to the other part, external or internal, under the action of a load applied to the element.

13 Claims, 3 Drawing Sheets

DEVICE FOR HOUSING A BEARING PROVIDED WITH A SYSTEM FOR DETECTING THE LOAD APPLIED TO THE BEARING

The present invention relates to the field of housings for bearings, in particular for roller bearings, permitting the detection of the load applied to said bearing during operation or when at a standstill.

The documents DE 2729699 and US 2002/0026839 disclose devices for housings for bearings. The housings are provided with strain gauges in order to permit, by measuring the variations of stresses at specific points of the housing, a measurement of the loads applied to the bearings.

Such devices use strain gauges, the positioning thereof being relatively awkward and often not very compatible with mass production at reasonable cost.

The document FR 2 863 706 discloses a device for measuring the load on a bearing for a washing machine, comprising capacitors provided with an insulator of which the thickness may vary according to the load and with a means for measuring the capacity of the capacitor, the capacity being representative of the load applied perpendicularly to the electrodes, one of the electrodes being formed from one of the rings of the bearing. Said device operates in a satisfactory manner. However, in certain applications, it is desirable to benefit from increased accuracy of measurement in at least one direction perpendicular to the axis of the bearing and, as a result, benefit from a greater variation in the gap and zero or negligible hysteresis.

The object of the invention is, in particular, to remedy the drawbacks cited above.

The invention relates to a reliable and accurate load measurement, based on the measurement of displacements due to elastic deformations of the housing under the load, the configuration of the device permitting a measurement which is not substantially affected by hysteresis.

The object of the invention is also to produce a device for measuring load which is not very sensitive to variation in environmental conditions, such as variations in temperature.

The housing device is provided with a system for detecting the load applied to an element arranged in the housing, with an internal part configured to support said element, and with an external part used for fixing the device to a mechanical assembly. The internal part is connected to the external part by at least two deformable connecting elements, such that the internal part may be displaced relative to the external part under the action of a load applied to said element. The system for detecting the applied load comprises a means for detecting the displacement of one of the parts, internal or external, relative to the other part, external or internal, under the action of a load applied to said element. A mobile detection portion is rigidly connected to the internal part and is mobile under the action of the load. The external part comprises a fixed detection portion aligned with the mobile detection portion to form at least one gap with said mobile detection portion. The detection portions are arranged in the vicinity of the axial plane of symmetry substantially perpendicular to the load to be measured. Increased sensitivity is gained, thus providing excellent measuring results. The connecting elements are capable of being elastically deformed in an applied load range which is sufficiently wide for the relevant application, and with negligible hysteresis.

In one embodiment, the detection portion of the internal part is uncoupled from the external part, relative to which said detection portion may be displaced without contact. The system for detecting the applied load also comprises detection means to measure the displacements of the internal part by means of the variations in the gap between the fixed and mobile detection portions.

The detection portions may be arranged in the vicinity of an axial plane of symmetry, substantially perpendicular to the load to be measured. The device may comprise at least two planes of symmetry perpendicular to one another.

Advantageously, the external part, the internal part and the connecting elements form a one-piece assembly. Said one-piece assembly may be obtained in mass production by molding a metal alloy or a synthetic material having the desired mechanical properties, in particular of elasticity, for the relevant application. The same mold provided for a one-piece assembly may be used to manufacture one-piece assemblies with different elastic properties, depending on the selected composition of the material, which proves particularly economical.

In one embodiment, the fixed detection portion is connected to the interior of the external part.

In a further embodiment, the fixed detection portion is in one piece with the external part.

Advantageously, as the fixed and mobile parts are separated by a gap between the electrodes supported by the fixed part and by the mobile part, the gap remains substantially constant when the temperature varies, the thicknesses and the coefficients of thermal expansion of the portions of the test body capable of varying the gap and the electrodes being determined such that a positive variation of at least one element is compensated by a negative variation of at least one further element. The gap may be substantially constant over a range of temperatures, for example from 0 to +50° C. in the field of household electrical appliances.

In other words, the thicknesses and the coefficients of thermal expansion of the components capable of varying the gap, in particular the fixed and mobile detection parts and the electrodes, are determined such that a positive variation of one element is compensated by a negative variation of a different element. The sum of the products of the thickness multiplied by the coefficient of thermal expansion of the elements producing a positive variation of the gap may be equal to the sum of the products of the thickness multiplied by the coefficient of thermal expansion of the elements producing a negative variation of the gap.

As the device is symmetrical relative to a plane passing through a geometric axis of said device, the product of the coefficient of thermal expansion of the fixed part and of the distance between the plane and one face of the fixed part may be equal to the sum of the product of the coefficient of thermal expansion of the mobile part and the distance between the plane and one face of the mobile part and of the product of the coefficient of thermal expansion of a first electrode and the thickness of the electrode.

In one embodiment, the means for detecting the displacement of the mobile part relative to the fixed part comprises at least one capacitive sensor. The device may comprise two pairs of electrodes to carry out a differential measurement.

In a further embodiment, the means for direct detection of the displacement of the mobile part relative to the fixed part comprises at least one inductive sensor.

The device may comprise a module for calculating the load applied to the device, according to the displacement detected by the detection system. The displacement detected may increase in a linear manner according to the load applied.

Said element arranged in the housing may comprise a bearing.

A washing machine may comprise a drum rotatably mounted on a fixed frame, by means of at least one roller bearing arranged in a device such as disclosed above. The frame supports the device.

The invention makes it possible to benefit from a housing permitting a simple and reliable measurement of the applied load, by avoiding significant hysteresis which complicates the use of the measurement data.

The present invention will be better understood by examining the detailed description of several embodiments given by way of non-limiting examples and illustrated by the accompanying drawings, in which.

Figure 1:
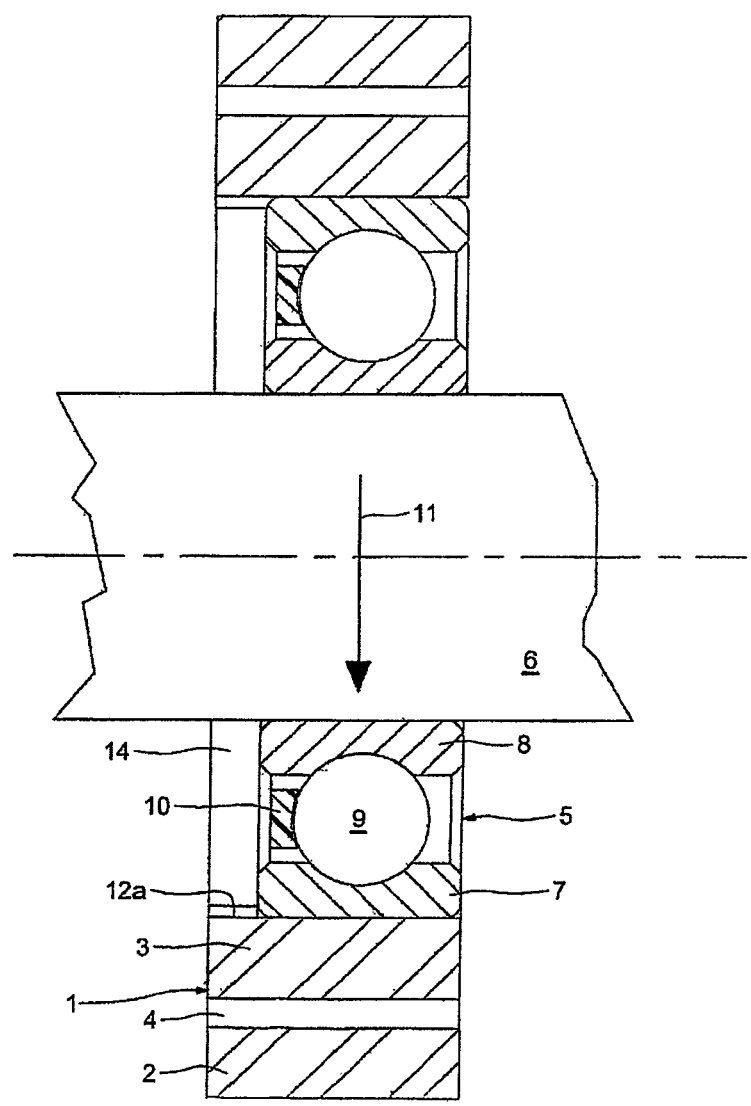
FIG. 1 is an axial sectional view of a housing device provided with a bearing mounted on a shaft.

As may be seen in FIG. 1, the housing device 1 comprises an external part 2 and an internal part 3 separated by a space 4. The external 2 and internal 3 parts are defined by two radial planes. The internal part 3 is provided with a bore, in which a roller bearing 5 mounted on a shaft 6 is arranged. The external part 2 is provided to be arranged in a mechanical assembly, for example a casing, a frame or a support, not shown.

The roller bearing 5 comprises an external ring 7, an internal ring 8, a row of rolling elements 9, in this case balls, maintained at regular circumferential intervals by a cage 10. The rolling elements 9 are arranged between an internal bearing race of the external ring 7 and an external bearing race of the internal ring 8. The roller bearing 5 is defined by the axial external surface of the external ring 7, the bore of the internal ring 8 and the front radial surfaces of the external 7 and internal 8 rings which pass on both sides of the rolling elements 9, each through a radial plane which merges on one side with the radial plane defining the housing device 1. The rings 7 and 8 are in this case produced from metal, for example steel, and the bearing races are machined with the removal of shavings.

The shaft 6 is capable of being subjected to a radial load oriented in the direction of the arrow 11. Said load causes a slight radial displacement of the shaft 6, the roller bearing 5 and the internal part 3 relative to the external part 2.

Figure 2:
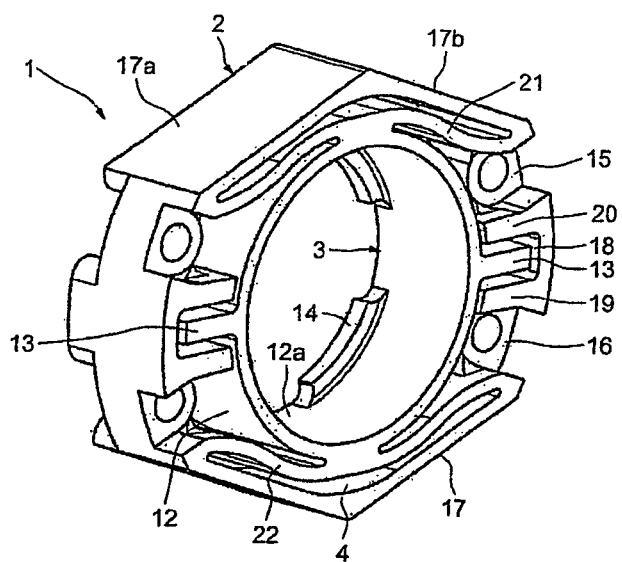
FIGS. 2 and 3 are perspective views of the housing device of FIG. 1.
Figure 3:
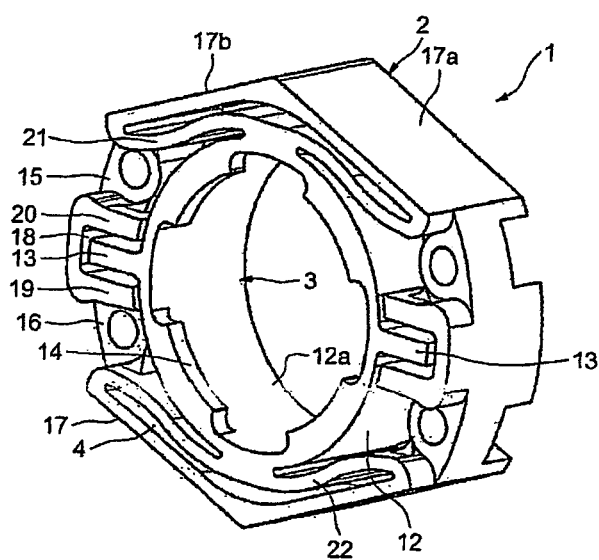

The structure of the housing device 1 is explained in more detail in FIGS. 2 and 3. The internal part 3 comprises a body of annular shape, defined axially by the aforementioned radial planes and having a substantially uniform thickness. The internal part 3 also comprises two mobile detection portions 13, in the form of diametrically opposed lugs extending toward the outside from the body 12. In the illustrated example, the mobile detection portions 13 have an axial length which is substantially equal to that of the body 12 and of the housing device 1. The internal part 3 also comprises a shoulder 14, in the form of a plurality of segments separated from one another and distributed in a regular manner circumferentially, flush with one of the defining radial planes defining the housing device 1 and extending radially toward the interior from the bore 12a of the annular body 12. The shoulder 14 is used as an axial stop for the roller bearing 5 during the assembly of said roller bearing 5 in the housing, and thus guarantees an axial positioning of the roller bearing 5. The mobile detection portions 13 and the shoulder 14 are integral with the body 12.

The external part 2 comprises a body 15 provided to be mounted in the bore of a casing or equivalent. The body comprises two thick portions 16, symmetrical relative to a plane passing through the axis of the housing device 1, and two portions 17 of low radial thickness, each roof-shaped and having two faces 17a and 17b, being joined in a plane of symmetry passing through the axis of the housing device 1. The faces 17a and 17b have a substantially uniform thickness, except at the point where they join, due to a wide fillet, on the concave side, i.e. on the internal side. The faces 17a and 17b are joined to the thick portions 16 opposite the ridge of the roof.

Each thick portion 16 comprises a groove 18 extending axially over the entire length of the housing device 1 and into which the mobile detection portion 13 of the internal part 3 projects. The thick portion 16 extends radially toward the interior to form fixed detection portions 19 and 20 in the form of a jaw, surrounding the mobile detection portion 13.

The housing device 1 is completed by a connecting portion 21 provided with four arms 22, which are of rounded shape and deformable, joined to the external part 3 substantially in the region of the join between the thick portion 16 and the portion of low thickness 17 and joined to the internal part 3 in a straight line from the join between the faces 17a and 17b of the portion of low thickness 17. At the same place, two symmetrical arms 22 are also joined to one another. Between the aforementioned joins, the arms 22 have a rounded shape between the internal part 3 and the portion of low thickness 17 and extend axially over all or part of the length of the housing device 1.

The external part 2, the internal part 3 and the connecting part 21 are in one piece and may be made by molding a synthetic conductive material, or even by molding a metal, for example an aluminum alloy. The housing device 1 is symmetrical relative to two perpendicular planes passing through the axis of said housing 1, one of the planes passing through the join between the faces 17a and 17b and the other plane passing through the mobile detection portions 13 which are thus offset at an angle of 180°.

In the resting state, the gap between the mobile detection portion 13 and the fixed detection portion 19 is equal to the gap between the mobile detection portion 13 and the fixed detection portion 20, on both sides of the housing device 1. When a radial load is applied, for example in the direction 11, i.e. vertically downward, the external part 2 remains substantially immobile, whilst the internal part 3 is displaced in the direction of the applied load. Thus the gap between the mobile detection portion 13 and the fixed detection portion 19 reduces, and the gap between the mobile detection portion 13 and the fixed detection portion 20 increases. The connecting arms 21 are deformed downward, without substantially deforming the internal portion 3 due, on the one hand, to its annular structure, and on the other hand, to the symmetry of the housing device 1 as a whole and without substantially deforming the external part 2 any longer, in particular due to the high thickness of the thick portion 16, a slight deformation of the portion of low thickness 17 being able to be tolerated without impairing the measurement.

Figure 4:
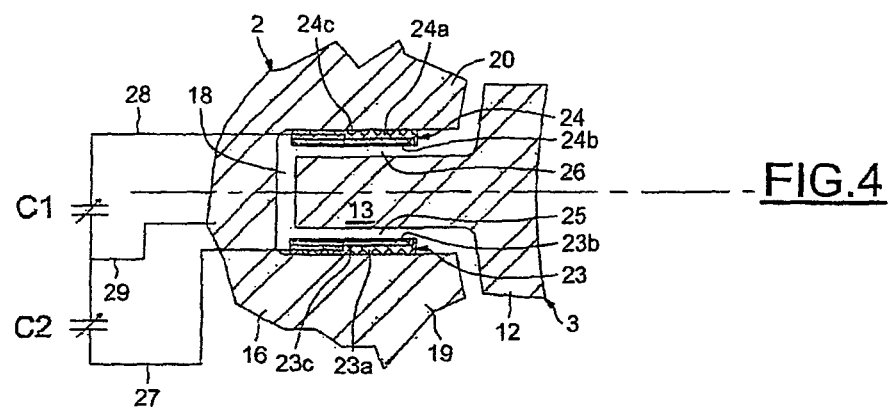
FIG. 4 is a detailed view in radial section of the device of FIG. 1.

As illustrated in FIG. 4, the external part 2 supports two detachable electrodes 23 and 24, respectively arranged on the fixed detection portions 19 and 20, on the edges opposing the groove 18. Each electrode 23, 24 comprises an insulating layer 23a, 24a, for example made of synthetic material, a conductive layer 23b, 24b arranged on the side of the mobile detection portion 13 and an internal conductive layer 23c, 24c or guard electrode forming an electromagnetic shield. More particularly, each electrode 23, 24 may be formed by a portion of printed circuit board, of which the carrier forms the insulating layer 23a, 24a and of which the metal conductor circuits form the conductive layers 23b, 24b and 23c, 24c. The electrodes 23 and 24 may thus be manufactured at low cost, then fixed, for example by bonding, to the edges of the groove 18.

Thus an electrical circuit is formed comprising two capacitors of variable capacity, C1 and C2, the capacitor C1 being formed by the conductive layer 24$b$ and the mobile detection portion 13 separated by a gap and the capacitor C2 being formed by the conductive layer 23$b$ of the electrode 23 and the mobile detection portion 13 separated by a gap 25.

The capacity of each capacitor C1, C2 is directly representative of the value of the gaps 25 and 26 and as a result of the load applied to the internal part of the housing device 1, to the extent where the application of the load causes the displacement of the mobile detection portion 13 relative to the electrodes 23 and 24 which remain fixed. Each electrode 23, 24 is provided with an exit wire 27, 28 and the conductive mass of the housing device 1 is connected by a wire 29 thus permitting the utilization of output signals.

Figure 5:
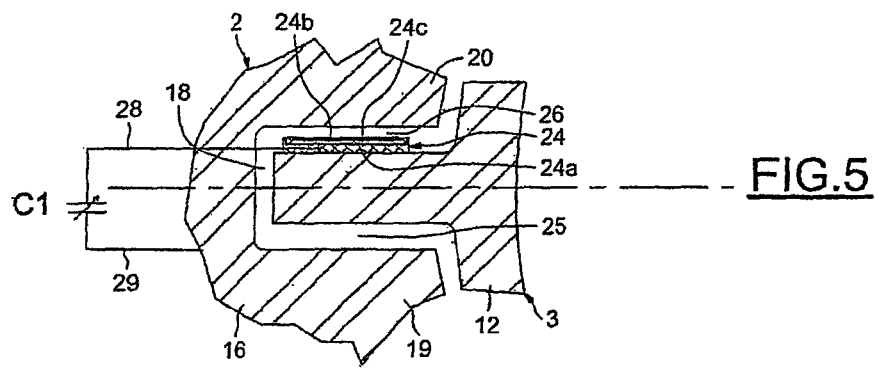
FIGS. 5 and 6 show variants of FIG. 4.

In the embodiment illustrated in FIG. 5, the device lacks the electrode 23. Only the capacity C1 varies therefore according to the gap between the mobile detection portion 13 and the electrode 24. The gap between the mobile detection portion 13 and the edge of the groove 18 opposing the electrode 24 remains without influence, insofar as the two surfaces are equipotential because the external part 2, the internal part 3 and the connecting part 21 of the housing device 1 are produced in one piece in conductive material.

Figure 6:
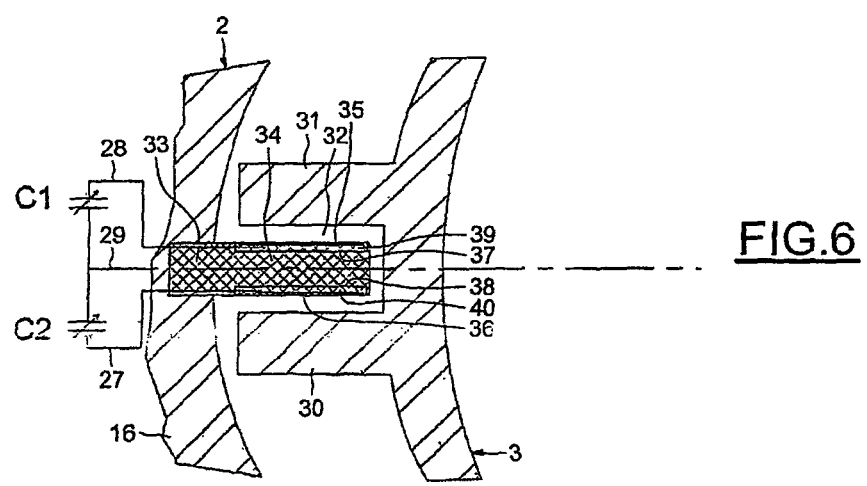

In the embodiment illustrated in FIG. 6, the wiring diagram is similar to that of FIG. 4, with two capacitors C1 and C2. However, the internal part 3 comprises two mobile detection portions 30 and 31, radially projecting toward the outside, defining therebetween an axially elongated groove 32. The external part 2 comprises a tongue 33 oriented radially toward the inside, arranged in the groove 32 between the mobile detection portions 30 and 31. The tongue 33 comprises a body made of synthetic insulating material 34, in which are arranged a measurement electrode 35 and a measurement electrode 36 respectively facing the mobile detection portions 30 and 31 of the internal part 3 and two guard electrodes 37 and 38 arranged at a short distance from the measurement electrodes 35 and 36 inside the tongue 33, whilst the measurement electrodes 35 and 36 are arranged on the surface. A dielectric layer 39, 40 is arranged between the electrode 35, 36 and the guard electrode 37, 38. The tongue 33 may be made in the form of a portion of multilayered printed circuit board.

In all these embodiments, guard electrodes may also be arranged around the measurement electrodes, in the same plane as said measurement electrodes.

Advantageously, the measurement electrodes and the guard electrodes may be stimulated simultaneously in order to create an efficient active shield.

As a result of all these precautions, from an electrical point of view it is possible to define the measurement electrodes with certainty and avoid side effects.

Due to the electromagnetic shield provided by the guard electrodes, parasite capacities and interference in the capacity measurement which might result from external electromagnetic fields are also avoided. Thus it is ensured that the measurement of capacity which is carried out is a good representation of the variation in the gap between the measurement electrode and the corresponding electrode facing said measurement electrode, i.e. between the fixed and mobile electrodes.

The embodiments of FIGS. 4 and 6 make it possible to carry out measurements of differential capacities, which considerably increases the reliability and the accuracy of the measurement of the variations in the gap by measuring the capacities. More specifically, parasite variations in capacities which may be noticeable in the region of each pair of electrodes are mutually canceled or reduced by the differential measurement.

The housing device 1 considered in this case as a deformable test body, is used in its elastic range. This use makes it possible for there to be a relation between load and deformation without hysteresis, since there is no friction. To limit the fatigue of the materials, the size of the connecting arms 21 limits their use below a threshold. A maximum applied stress may be selected, in the order of 80% of the elastic limit of the housing device, to be able to tolerate 10 million cycles of elastic deformation without significant permanent deformation.

The materials of the different elements in the vicinity of the gap, i.e. of the housing device 1 and of the electrodes, are selected with coefficients of expansion and dimensions such that the dimensional variations of the elements due to the changes in temperature are compensated and do not cause significant variations in the gap. To this end, the ratio between the coefficients of thermal expansion of the materials used for said adjacent elements of the gap is selected to be close to the inverse of the ratio of the thicknesses of said elements to permit a uniform gap over a wide range of temperature.

For example, if a test body made of aluminum alloy is used with a coefficient of thermal expansion of 23 ppm/°K, allowing an initial gap $E_i$ of 1.5 mm before mounting the detachable electrode, a detachable electrode may be selected, composed for example of a printed circuit of the glass teflon type, with a coefficient of thermal expansion in the order of 34.5 ppm/°K and of standard thickness of 1 mm. The gap of the aluminum test body expands by 1.5 mm×23 ppm/°K=34.5 nanometers/°K. The detachable electrode expands by 1 mm×34.5 ppm/°K=34.5 nanometers/°K. The usable measured gap separating the face of the detachable electrode and the corresponding aluminum face is thus uniform and equal to 1.5−1=0.5 mm.

However, the choice may be made to optimize the initial gap of the carrier according to the materials used for the printed circuit forming the electrode. For example, knowing that a detachable electrode made of a material having a coefficient of thermal expansion of 50 ppm/°K and of standard thickness of 0.5 mm is particularly economical and, denoting by $E_i$ the initial gap of the aluminum test body, would produce the relation: $E_i \times 23 = 0.5 \times 50$, from which is deduced $E_i = 1086$ mm, namely a usable measured gap $E_i − 0.5 = 0.586$ mm.

The examples illustrated in FIGS. 4 and 6 show sensors of the capacitive type. Naturally, the housing device 1 may be provided with displacement sensors of the inductive type.

The sensor housing device made according to one aspect of the invention is particularly accurate and reliable. The measurement carried out does not have significant hysteresis and is practically unaffected by external parasitic phenomena, such as variations in temperature or hygrometry.

As a result of the invention, a support housing for load sensors is therefore provided which is particularly economical, being able to be used with conventional bearings or provided with speed sensors and/or temperature sensors, being able to be mounted in a simple manner, and the housing ensuring an accurate and reliable measurement of the load.

The invention claimed is:
1. A housing device comprising:
   a detection system configured to detect a load applied to an element arranged in said housing device,
   an internal part configured to support said element and
   an external part used for fixing the device to a mechanical assembly, the internal part being connected to the external part by at least two deformable connecting elements, such that the internal part may be displaced in the direction of the applied load relative to the external part under the action of the load applied to said element;
wherein the detection system comprises:
a displacement detection device that detects the relative displacement of the internal part with respect to the external part, or the external part with respect to the internal part under the action of the load applied to said element,
a mobile detection portion rigidly connected to the internal part and thus mobile under the action of the load,
wherein the external part comprises a fixed detection portion aligned with the mobile detection portion to form at least one gap in the direction of the applied load with said mobile detection portion,
wherein said detection portions are arranged in the vicinity of the axial plane of symmetry substantially perpendicular to the load to be measured,
wherein said detection portions measure the relative displacement of the internal part with respect to the external part, or the external part with respect to the internal part, in the direction of the applied load.

2. The device as claimed in claim 1, wherein the mobile detection portion is displaceable without contacting the fixed detection portion, the external part comprising a detection device that detects the relative displacement of the internal part with respect to the external part by determining variations in the gap between the fixed detection portion and the mobile detection portion.

3. The device as claimed in claim 1, comprising at least two planes of symmetry perpendicular to one another.

4. The device as claimed in claim 1, in which the external part, the internal part and the connecting elements form a one-piece assembly.

5. The device as claimed in claim 1, in which the fixed detection portion is connected to the interior of the external part.

6. The device as claimed in claim 1, wherein the displacement detection device comprises electrodes supported by the fixed detection portion and/or the mobile detection portion, and wherein the materials used to form the fixed detection portion, the mobile detection portion and the electrodes is selected such that the gap between the fixed detection portion and the mobile detection portion remains substantially constant when the temperature varies, the thicknesses and the coefficients of thermal expansion of the materials being determined such that a positive variation of at least one of the fixed detection portion, the mobile detection portion and the electrodes is compensated by a negative variation of at least one of the fixed detection portion, the mobile detection portion and the electrodes.

7. The device as claimed in claim 1, wherein the displacement detection device comprises at least one capacitive sensor.

8. The device as claimed in claim 7, wherein the capacitive sensor comprises two pairs of electrodes to carry out a differential measurement.

9. The device as claimed in claim 1, wherein the displacement detection device comprises at least one inductive sensor.

10. The device as claimed in claim 1, further comprising a module for calculating the load applied to said device, according to the displacement detected by the detection system.

11. The device as claimed in claim 1, in which said element arranged in the housing comprises a bearing.

12. Washing machine comprising a drum rotatably mounted on a fixed frame by means of at least one roller bearing arranged in a housing device the housing device comprising:
a detection system configured to detect a load applied to an element arranged in said housing device,
an internal part configured to support said element and
an external part used for fixing the device to a mechanical assembly, the internal part being connected to the external part by at least two deformable connecting elements, such that the internal part may be displaced in the direction of the applied load relative to the external part under the action of the load applied to said element;
wherein the detection system comprises:
a displacement detection device that detects the relative displacement of the internal part with respect to the external part, or the external part with respect to the internal part, under the action of the load applied to said element,
a mobile detection portion rigidly connected to the internal part and thus mobile under the action of the load,
the external part comprising a fixed detection portion aligned with the mobile detection portion to form at least one gap in the direction of the applied load with said mobile detection portion,
wherein said detection portions are arranged in the vicinity of the axial plane of symmetry substantially perpendicular to the load to be measured wherein said detection portions measure the relative displacement of the internal part with respect to the external part, or the external part with respect to the internal part, in the direction of the applied load.

13. A housing device comprising:
a detection system configured to detect a load applied to an element arranged in said housing device;
an internal part configured to support said element; and
an external part used for fixing the device to a mechanical assembly, the internal part being connected to the external part by at least two deformable connecting elements, such that the internal part may be displaced in the direction of the applied load relative to the external part under the action of the load applied to said element;
wherein the detection system comprises:
a displacement detection device that detects the relative displacement of the internal part with respect to the external part under the action of the load applied to said element,
a mobile detection portion rigidly connected to the internal part and thus mobile under the action of the load,
wherein the external part comprises two fixed detection portion in the form of a jaw, surrounding the mobile detection portion to form two gaps in the direction of the applied load to the said mobile detection portion,
wherein said detection portions are arranged in the vicinity of the axial plane of symmetry substantially perpendicular to the load to be measured.

* * * * *